PULSE CODE SIGNALLING SYSTEMS

Filed Dec. 2, 1950 2 Sheets-Sheet 1

INVENTORS
BRIAN LEONARD GARNER
MAURICE MOISE LEVY
BY [signature]
ATTORNEY

PULSE CODE SIGNALLING SYSTEMS

INVENTORS
BRIAN LEONARD GARNER
MAURICE MOISE LEVY
BY [signature]
ATTORNEY

United States Patent Office 2,716,732

Patented Aug. 30, 1955

2,716,732

PULSE CODE SIGNALLING SYSTEMS

Brian Leonard Garner, Staines, England, and Maurice Moïse Levy, Ottawa, Ontario, Canada, assignors to The General Electric Company Limited, London, England Application December 2, 1950, Serial No. 198,772

Claims priority, application Great Britain December 5, 1949

12 Claims. (Cl. 332—11)

The present invention relates to signalling systems using pulse code modulation.

In pulse code modulation, each quantum of intelligence is usually conveyed by the presence or absence of pulses in a small plurality of recurrent (and usually regularly recurrent) pulse intervals or time positions, the pulse intervals occurring at fixed times and the nature of the intelligence determining in which of these intervals pulses are transmitted. Thus, the intelligence represented is unaffected by relatively large variations in the amplitude, width and shape of the pulses, such as may be produced by interference.

In one known system of pulse code modulation for multi-channel operation, each channel is periodically allotted a separate time interval, referred to as the channel interval. The channel intervals allotted to each channel are recurrent at a given frequency and the channel intervals of the several channels are interleaved with one another. Each channel interval carries one quantum of intelligence and for this purpose is divided into five equally spaced pulse intervals. The single pulses which may be transmitted in each of these pulse intervals are of like amplitude, width and waveform. It will be assumed that the intelligence to be transmitted is the instantaneous amplitude of a wave. Using five pulse intervals to define a quantum of intelligence merely by the presence or absence of a pulse in each pulse interval, thirty-two distinct values of such amplitude can be represented, including zero amplitude. In general, if $n$ be the number of pulses, the number of distinct amplitudes that can be represented, including zero amplitude, is equal to $2^n$. If the pulse intervals within the channel interval are numbered 1 to 5 in order of occurrence, zero amplitude may be represented by no pulses; amplitude value 1 may be represented by a pulse occurring only in interval 1; amplitude value 2 by a pulse occurring only in interval 2; amplitude value 3 by pulses occurring only in intervals 1 and 2, and so on.

The usual method of transmitting such pulses is by radio and in that case each pulse is represented by a burst of radio-frequency oscillation.

The present invention has for its object to provide improved means for generating pulse code signals.

According to the present invention, apparatus for generating a pulse code signal representative of a voltage level differing by S from a datum level comprises means for generating a succession of pulses of progressively decreasing amplitude, means for subtracting the peak voltages of successive pulses from a succession of voltage values to produce resultant voltages respectively, the first of said voltage values being S and each of the remaining voltage values being that obtained in the nearest preceding subtraction in which the resultant voltage is of the same sign as S with respect to the datum level, and means for generating pulse signal elements which correspond one to each of the first-named pulses and distinguish between those first-named pulses which give rise to resultant voltages of the same sign as S with respect to the datum level and those which gave rise to resultant voltages of the opposite sign.

Each element of the pulse signal generated by the last-mentioned means may consist of a pulse interval which selectively does or does not contain a single pulse depending, but not necessarily respectively, on whether the resultant voltage is of the same sign as, or the opposite sign to, S with respect to the datum level.

One apparatus in accordance with the present invention will now be described by way of example with reference to the accompanying drawings in which.

Figure 2:
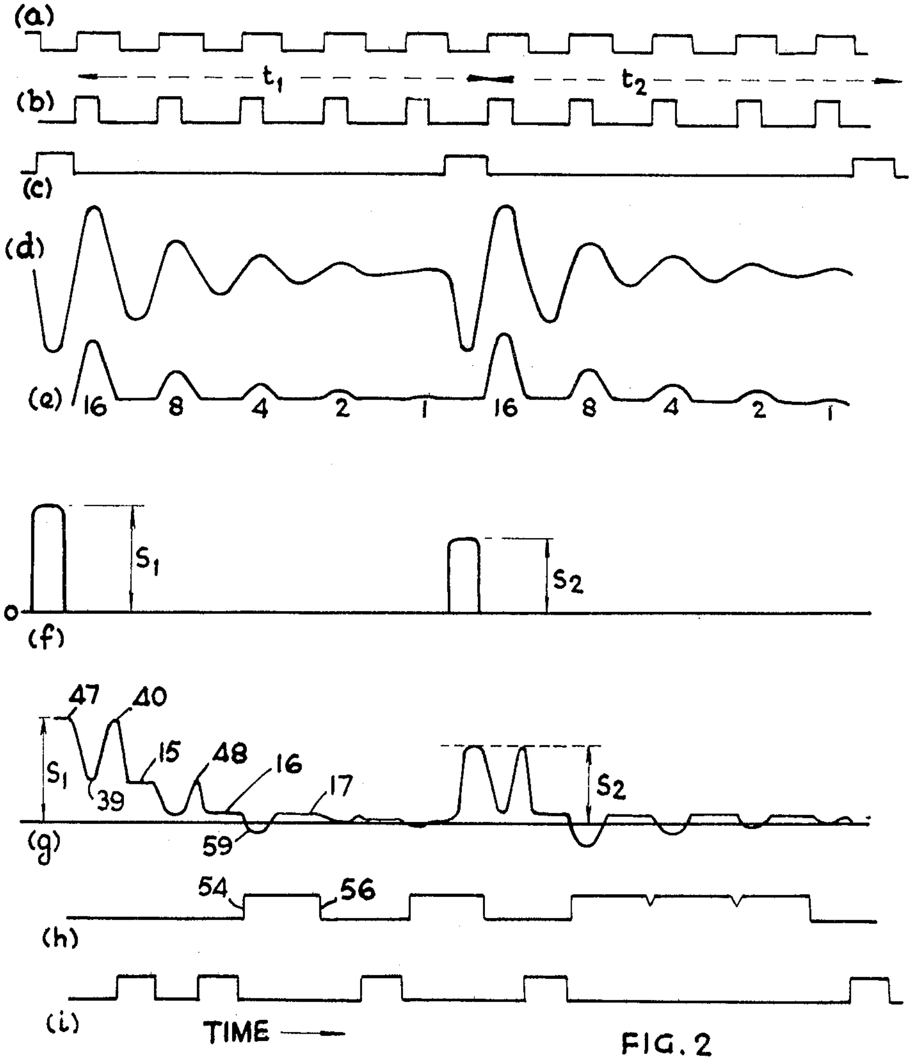
Figure 3:
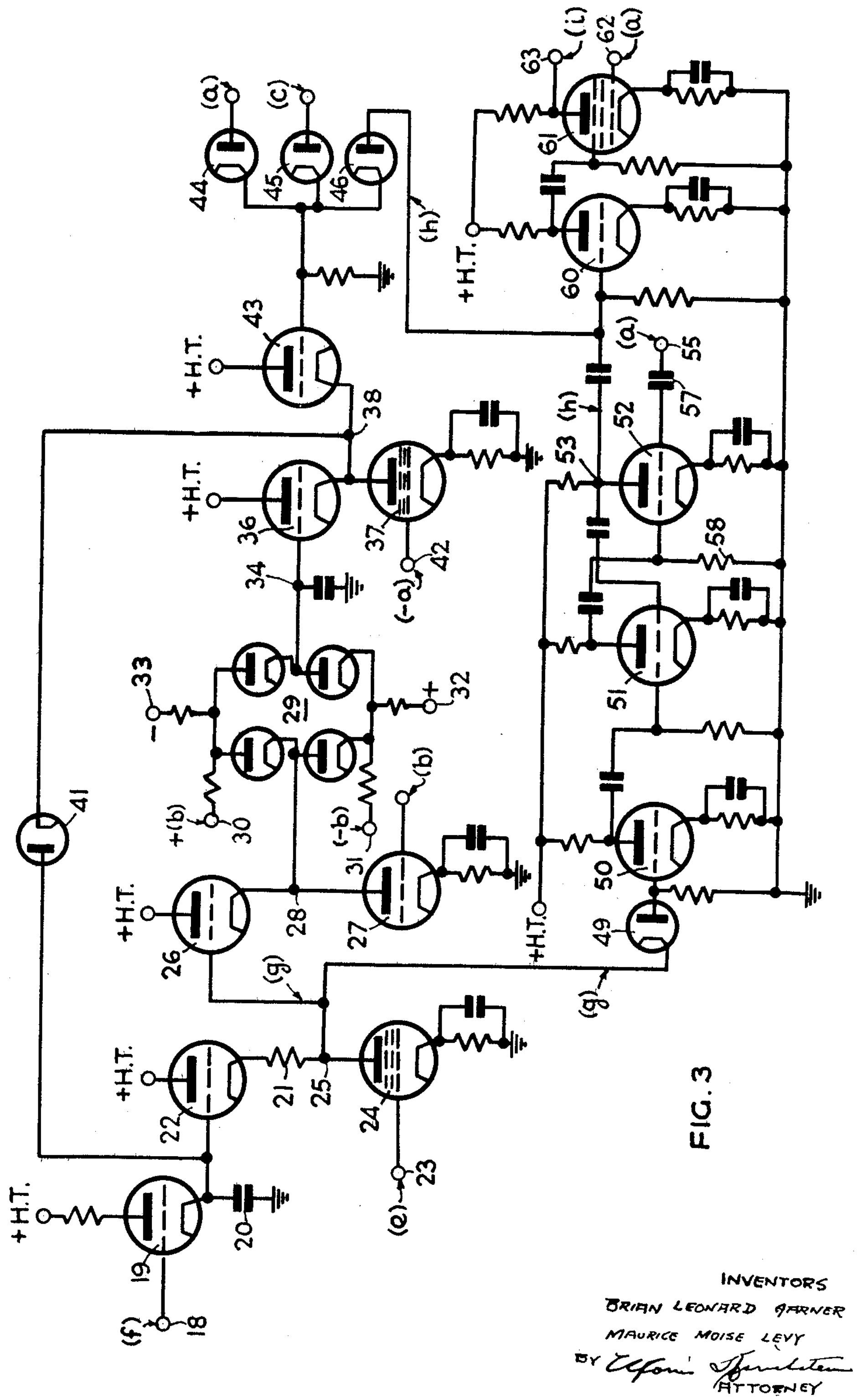
Figure 3 is a circuit diagram of the embodiment.

Figure 2 contains waveforms marked *a* to *i* of signals which are employed in the arrangement of Figure 3 and the points in Figure 3 at which these waveforms occur are indicated by the same letters *a* to *i* respectively.

Figure 1:
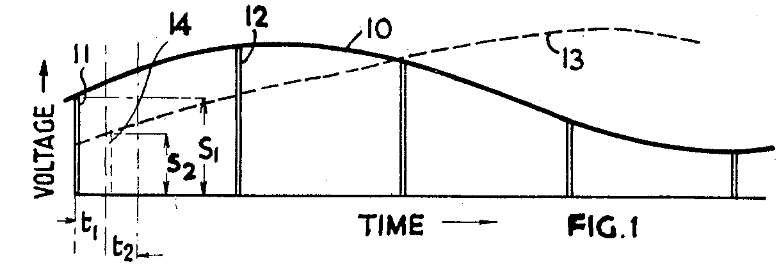
Figures 1 and 2 are explanatory diagrams.

Referring to Figure 1, it is assumed that it is required to send a pulse code signal representative of the amplitude of a signal 10. This signal 10 is treated in known manner by periodically sampling to produce pulses 11, 12, etc. whose amplitude represents the amplitude of the waveform 10 at predetermined regularly recurrent instants. The system to be described is a multi-channel system in which it has been assumed that the number of channels is five, although of course any number of channels may be employed.

The sampling circuit may comprise a plurality of pentode thermionic valves having a common anode resistance, these values being allocated one to each channel included in the final multiplex signal. Considering now one of these valves, the cathode is connected to earth through a bias resistance which is shunted by a condenser and a further resistance is connected between the suppressor grid and the cathode. The appropriate channel signal is continuously fed to the control grid of this valve through a transformer and a gating signal is supplied through a condenser to the suppressor grid. The gating signal consists of positive-going pulses which occur at the channel recurrence frequency of the system and the arrangement is such that the valve to which it is applied is only conducting during the period of the pulses and it will be appreciated that when it is conducting, the voltage across the said common anode resistance is a measure of the amplitude level on the associated channel at that instance. The gating signal applied to the several valves are staggered in time so that only one of these valves is conducting at a time and the required signal for coding is produced across the common anode resistance. The gating signals may be supplied from tapping points spaced along a delay line to one end of which is fed a signal having positive-going pulses which occur at the correct frequency, for example having the waveform *c* in Figure 2.

The waveform to be transmitted by one other such channel is indicated in broken lines at 13 and the first of the pulses for this waveform is indicated at 14. The recurrent channel intervals $t_1$ of pulses 11, 12, etc. are available for the transmission of coded pulses representative of the instantaneous amplitudes of these pulses and the recurrent channel intervals $t_2$ are used similarly for coded pulses representing the amplitudes of the pulses 14, etc. In the following description it will be described how the amplitude level $S_1$ of the pulse 11 and the amplitude level $S_2$ of the pulse 14 may be represented by a pulse code signal. It will be assumed that a group of five pulse intervals are allotted to each sample, thus providing, as already explained, thirty-two different values of amplitude that can be transmitted, although other numbers of pulse intervals may of course be used if desired.

Referring to Figure 2, the curve *a* is of a signal having rectangular waveform and a period equal to the period of the pulse intervals of the pulse signal to be transmitted. The intervals $t_1$ and $t_2$ in Figure 2 correspond to the intervals with the same references in Figure 1. Since, as already stated, five coded pulses are to be produced in each recurrent group, the intervals $t_1$ and $t_2$ each include five cycles of the wave at *a*. The waveform at *a* may be produced in well-known manner by means of an oscillation generator and suitable clipping and squaring circuits (all of which are not shown).

The waveform *b* is of the same frequency as that at *a* but the positive-going portions of each cycle are of smaller duration. The signal having this waveform may be produced in the same manner as the waveform at *a*, the clipping being, however, carried out at a higher amplitude level of the oscillations supplied by said generator.

The waveform at *c* consists of what may be called pulses having a recurrence frequency which is one-fifth that of the waveforms *a* and *b* and is therefore equal to the recurrence frequency of adjacent groups of pulse intervals in the resulting pulse code signal.

A signal having the waveform at *d* is produced by applying the pulses at *c* to shock-excite a parallel tuned circuit having a natural frequency equal to that of the waveforms *a* and *b*. The damping of this tuned circuit is arranged to be such that the amplitude of each positive peak developed across the tuned circuit is one-half of that of the preceding positive peak. The waveform at *e* is obtained by amplitude-limiting the waveform at *d* to retain only the positive-going portions. The relative amplitudes of the peaks in the curve *e* are indicated by the numerals 16, 8, etc.

The circuit for providing a signal having the waveform *e* may comprise a thermionic valve having a resistance in its anode circuit. A signal having the waveform *c* is fed to the control grid of this valve, which is arranged to operate as an amplifier, and a coupling condenser is connected between one side of a parallel-connected inductance and capacity and the anode of this valve, the other side of the parallel tuned circuit being earthed. The amplified pulse signal is thereby caused periodically to excite the tuned circuit. A diode valve may be provided with its anode connected to the junction of said coupling condenser and the tuned circuit and its cathode through a further resistance to earth. This diode valve is only conducting during the positive half cycles of the waveform *d* which is produced across the tuned circuit so that a signal having the waveform *l* is developed across the further resistance in the cathode circuit of the diode valve. The required signal may be passed through a cathode follower stage before being utilised as hereinafter described.

The curve *f* indicates two successive samples having voltage levels $S_1$ and $S_2$ respectively to be converted into a pulse code signal.

The curve *g* is obtained, as hereinafter described, by subtracting successive peaks of the waveform *e* from the voltage level of the waveform *f* in such a manner that whenever the resultant voltage obtained by such subtraction is positive relatively to the datum level marked 0, this resultant voltage is retained and the next peak of the waveform *e* is subtracted from it. Whenever the resultant voltage is negative, however, the resultant voltage preceding the subtraction which renders the resultant voltage negative is retained. Thus the effect of subtracting the first peak of amplitude 16 from the amplitude $S_1$ is to produce an amplitude 15 which is the resultant voltage of the subtraction. Since this resultant voltage is positive relative to 0, this resultant voltage is retained and from it is subtracted the next peak of amplitude 8. Here again, in the example, we note the resultant voltage is positive as indicated at 16 in curve *g* and from this is subtracted the third peak of amplitude 4 which, as will be seen, renders the resultant voltage negative. Because of this, instead of retaining this new and negative resultant voltage, the previous resultant voltage, namely the level 16, is retained at 17, and so on.

The waveform *h* contains pulses whose leading edges occur whenever the waveform *g* crosses the datum 0 from positive to negative, the trailing edges of these pulses occurring at fixed times a little less than one period of the waveform *a* later.

The waveform *i* is the desired pulse code signal and it is derived by gating the pulses *a* by means of the pulses *h*, the pulses *a* being allowed to pass through the gate whenver the waveform *h* is negative.

Referring now to Figure 3, the waveform *f* is applied at a terminal 18 to the control grid of a valve 19, having a condenser 20 in its cathode circuit. In this way the condenser 20 receives a charge and assuming that initially it was uncharged the voltage across the condenser is made substantially equal to $S_1$. A like voltage is developed across the resistor 21 in the cathode circuit of a valve 22. The waveform *e* is applied to a terminal 23 and thus to the control grid of a valve 24. If desired this valve may be so biased as to effect the necessary amplitude limiting to produce the waveform *e* from the waveform *d*. In this case the waveform *d* is applied to the terminal 23. It will be seen that, in any case, the voltage at the point 25 will be the difference between the effective voltage across the condenser 20 and the voltage applied to the terminal 23 multiplied by the amplification factor of the valve 24, the latter voltage being reversed in sign by the valve 24.

Consideration will first be given to the conditions existing when there is applied to the terminal 23 the first peak of amplitude 16 units of the curve *e*. During the time under consideration, a signal having the waveform *g* between points 47 and 40, which is the difference referred to above, is applied to the control grid of a valve 26 having a valve 27 in its cathode circuit. It will be assumed initially for simplicity that the valve 27 operates as a simple impedance. The voltage at the point 28 therefore substantially follows that at the point 25 and the former voltage is applied through a clamping circuit 29, including four diodes connected as shown. The waveform *b* is applied to a terminal 30 and the same waveform reversed in sign, represented by $-b$, is applied to a terminal 31. A terminal 32 has applied thereto a suitable positive bias and a terminal 33 has applied thereto a suitable negative bias. This clamping circuit 29 is of well known type and is such that in the absence of pulses at terminals 30 and 31 there is a high impedance between terminals 28 and 34. When however the pulses *b* and $-b$ are applied to terminals 30 and 31 respectively, the point 34 assumes the instantaneous potential of the point 28, thus charging a condenser 35 correspondingly. The condenser 35 is thus charged to a voltage corresponding to the point 39 in curve *g* since each pulse of the waveform *b* which opens the clamping circuit 29 is arranged to end substantially at the minimum of the waveform *g*.

As shown the signal having the waveform *b* is applied also to the control grid of the valve 27, and the effect of this is that during the pulses of waveform *b* the valve 27 has a very low impedance and consequently a large current can flow therethrough. The effect of this application of the waveform *b* to the valve 27 is thus to increase the rate at which the condenser 35 receives or loses charge.

As the voltage represented by the waveform *g* increases from point 39 to point 40, the potential at the point 28 increases correspondingly, but this has no effect upon the charge on the condenser 35 since the clamping circuit 29 is then insulating. The voltage at the point 34 is applied to the control grid of a valve 36 having in its cathode circuit a further valve 37 which may, in the first place, be regarded as a constant impedance. A voltage corresponding to that at point 34 is therefore produced at point 38. Between the point 38 and the cathode of the valve 19 is connected a diode 41. Under the conditions which are being considered, the potential at the point 38 will correspond to that of point 39 in curve *g*, while the potential at the cathode of the valve 19 and hence at the anode of the diode 41 will be at the potential $S_1$. Consequently the diode 41 will conduct and the cathode of the valve 19 will assume the potential of point 38, namely that of point 39 in curve *g*. As shown in the drawings, a signal having a waveform which is the same as that of *a* but reversed in sign, labelled $-a$, is applied to a terminal 42 and hence to the control grid of the valve 37. The result is to make the valve 37 highly conducting during the half-cycle at the frequency of the waveform *a* immediately following the point 40 in curve *g*, and this has the effect of hastening the change of charge of the condenser 20 and hence the assumption by the cathode of the valve 19 of the desired potential.

In describing the potential at the point 38, no account has so far been taken of the circuits connected to the point 38 to the right thereof in the drawing. Thus the point 38 is connected to the cathode of a valve 43, the control grid of this valve being connected to the cathode of three diodes 44, 45 and 46. If, owing to a positive potential at the anodes of any one of these diodes, the control grid of the valve 43 is driven positive, it is arranged that the point 38 is driven so positive that the diode 41 is prevented from conducting. To the anode of the diode 44 is applied the waveform *a* and it will be seen from curves *a* and *g* that the effect of this diode is to prevent conduction of the diode 41 during the interval between the points 47 and 40 in curve *g* whilst the waveform *a* is positive. However, conduction of the diode 41 is permitted during the interval between points 40 and 48 when the waveform *a* is negative. Thus, in spite of the action of the diode 44, the cathode of the valve 19 assumes the potential of the point 38, as described, through conduction of the diode 41 during the interval between points 40 and 48, the potential of the terminal 18 having fallen to zero by that time, so that the cathode of the valve 19 assumes the level 15 in curve *g*.

During the period whilst the second peak of the curve *e* is operative upon the terminal 23, the behaviour of the circuit described is the same as that already described for the first peak, and after the second peak has ceased the cathode of the valve 19 assumes the potential 16 in curve *g*.

The point 25 is connected to the cathode of a diode 49, the anode of which is connected to the control grid of a valve 50, this control grid being normally held at earth potential. Whenever the point 25 falls below earth potential, which in this example is the datum potential, the diode 49 will conduct. It will be seen from waveform *g* that this occurs at the point 59 during the third peak of the waveform *e*. The effect of such conduction of the diode 49 is that the grid of the valve 50 is driven negatively, causing a positive pulse to appear at the anode of the valve 50. This positive pulse is applied to a multivibrator comprising two valves 51 and 52, which are so biased that normally the valve 51 is cut off and the valve 52 is conducting. When the positive pulse arrives on the grid of the valve 51, this valve is caused to conduct and the multivibrator triggers producing at the point 53 the leading edge 54 of the waveform *h*. Owing to a suitably long time constant this condition is arranged to be maintained until a positive pulse is applied to terminal 55 to render the valve 52 once more conducting and generate the trailing edge 56 of the waveform *h* at the point 53. In order to generate this positive pulse, the waveform *a* is applied to terminal 55. It will be noted that the leading edge 54 in curve *h* occurs slightly after a positive-going leading edge of curve *a*. The next following negative-going trailing edge of curve *a* produces a negative pulse at the terminal 55 which has no effect on the multivibrator, and it is the next succeeding positive-going edge of the waveform *a* that is used to reset the multivibrator.

The condenser 57 and leak resistor 58 serve to differentiate this positive-going edge and produce a sharp positive pulse at the terminal 55 which resets the multivibrator. In the arrangement being described the multivibrator is triggered as soon as the waveform *g* passes below the datum level to produce the leading edge of a pulse in the waveform *h*. There may alternatively be some delay, it merely being necessary for a pulse in the waveform *h* to commence before the next negative-going edge of the waveform *a*.

When in its reset condition, the occurrence of a positive-going edge of the waveform *a* has no effect on the multivibrator. In fact so long as the waveform *g* on the terminal 25 remains positive, the diode 49 is non-conducting and the valve 50 and multivibrator 51, 52 do not operate. The signal having the waveform *h* generated at the point 53 is applied to the anode of the diode 46 and ensures that throughout the duration of a positive-going pulse in the waveform *h* the diode 41 cannot conduct, and hence the voltage at the cathode of the valve 19 cannot change. It is for this reason that after the negative excursion of the curve *g* through the point 59 the voltage level is as shown at 17, which is the same as that at 16.

The voltage of waveform *h* is also applied through a valve 60 to the suppressor grid of a valve 61, the valve 60 serving merely to invert the phase of the waveform *h*. The waveform *a* is applied to terminal 62, and thus to the control grid of the valve 61. The pulses applied to the suppressor grid of the valve 61 serve to gate this valve and allow the pulses applied to the terminal 62 to produce an output at a terminal 63 only whilst the suppressor grid is positive and to prevent the pulses at terminal 62 from having any effect at the terminal 63 throughout the duration of negative pulses upon the suppressor grid, that is between such points as 54 and 56 in curve *h*. The waveform at terminal 63 is therefore as shown at *i* and is the pulse code representation of the curve *f*.

Assuming that the coded pulses have the significance, reading from left to right, of the magnitudes 16, 8, 4, 2 and 1 respectively, the amplitude level $S_1$ represented by the pulse code appearing in the channel internal $t_1$ and consisting of three pulses represents the magnitude 26, that is to say there are 26 increments of predetermined amplitude in the level $S_1$. The amplitude level $S_2$ in curve *f* gives rise to the two coded pulses occurring in the interval $t_2$ and these represent the magnitude 17.

The pulses *c* are applied to the anode of the diode 45 and these prevent the diode 41 from conducting during the periods whilst the waveform *f* is changing its magnitude.

It will of course be understood that the pulse code signal make take other forms, for instance finite significances may be given to the condition where there is no pulse, and zero significance to the condition when a pulse is transmitted. In this case the magnitude $S_1$ in curve *f* would be represented by pulses appearing in intervals 3 and 5, instead of in intervals 1, 2 and 4 as shown, and the magnitude $S_2$ would be represented by pulses appearing in the intervals 2, 3 and 4 instead of in the intervals 1 and 5. In order to obtain this result, it is only necessary to omit the valve 60 and apply the waveform *h* directly to the suppressor grid of the valve 61.

In another arrangement pulses of one sense or the other are transmitted in all the intervals, those in one sense having a finite significance and those in the opposite sense having zero significance. This may be done, for example, by combining with the waveform *i* a second waveform constituted by gating pulses of the form *a* by means of pulses of the form *h* in such a manner that the former pulses are allowed to pass only during the positive-going pulses of the waveform *h*.

We claim:

1. Apparatus for generating a pulse code signal representative of a voltage level with respect to a datum level, said apparatus comprising first storage means for initially storing the said voltage level, means for generating a signal formed by a train of pulses of progressively decreasing amplitude, means for continuously subtracting the said signal from the level stored by the first storage means, sense determining means for determining whether the remainder of this subtraction is the same sign as, or the opposite sign to, the said voltage level with respect to the datum level, second storage means for successively storing the levels obtained by subtracting the peaks of successive pulses of said train from the level stored by the first storage means, means to reduce the level stored by the first storage means to each new level stored by the second storage means provided that the level stored by the second storage means is not the result of a subtraction, as determined by the sense determining means, which caused the said remainder to be the opposite side of the datum level to the said voltage level, and means for generating pulse signal elements which correspond one to each of the first-named pulses of the said train and distinguish between those first-named pulses which give rise to resultant voltages of the same sign as the said voltage level with respect to the datum level and those which rise to resultant voltages of the opposite sign.

2. Apparatus according to claim 1 wherein the first storage means is a condenser.

3. Apparatus according to claim 1 wherein the second storage means is a condenser.

4. Apparatus according to claim 1, wherein clamping means is connected between the said means for effecting continuous subtraction and the second storage means, the clamping means being arranged momentarily to present a low impedance at the peak instant of each pulse of the said signal.

5. Apparatus for generating a pulse code signal representative of a voltage level with respect to a datum level, said apparatus comprising first storage means for initially storing the said voltage level, means for generating a signal formed by a train of pulses of progessively decreasing amplitude, means for continuously subtracting the said signal from the level stored by the first storage means, sense determining means for determining whether the remainder of this subtraction is the same sign as, or the opposite sign to, said voltage level with respect to the datum level, second storage means, clamping means connected between the subtracting means and the second storage means for periodically transferring to the second storage means the level corresponding to the subtraction of each peak of said train from the level stored by the first storage means, means periodically to reduce the level stored by the first storage means to each new level stored by the second storage means, means dependent upon said sense determining means to override the last mentioned means to prevent the level of the first storage means being reduced when the level stored by the second storage means is the result of a subtraction which caused the said remainder to be the opposite side of the datum level to said voltage level, and means for generating pulse signal elements which correspond one to each of the first-named pulses of the said train and distinguish between those first-named pulses which give rise to resultant voltages of the same sign as said voltage level with respect to the datum level and those which rise to resultant voltages of the opposite sign.

6. Apparatus according to claim 5 wherein the means for generating a train of pulses of progressively decreasing amplitude comprises a damped tuned circuit, means to shock-excite the tuned circuit and means to amplitude limit the damped oscillations produced by the tuned circuit.

7. In a pulse code signalling system, transmitting equipment which includes means for periodically sampling the signal or signals to be transmitted and apparatus according to claim 5 for generating a pulse code signal defining the voltage level with respect to a datum level of successive samples.

8. Apparatus for generating a pulse code signal representative of a voltage level with respect to a datum level, said apparatus comprising first storage means for initially storing the said voltage level, means for generating a signal formed by a train of pulses of progressively decreasing amplitude, means for continuously subtracting the said signal from the level stored by the first storage means, sense-determining means for determining whether the remainder of this subtraction is the same sign as, or the opposite sign to, said voltage level with respect to the datum level, second storage means, clamping means connected between the subtracting means and the second storage means for periodically transferring to the second storage means the level corresponding to the subtraction of each peak of said train from the level stored by the first storage means, a unidirectionally conducting device connected on one side to the first storage means, a cathode follower stage connected between the second storage means and the other side of said unidirectionally conducting device, means periodically to render said cathode follower stage operative so as then to reduce the level stored by the first storage means to each new level stored by the second storage means, means dependent upon said sense determining means to override the last-mentioned means to prevent the level of the first storage means being reduced when the level stored by the second storage means is the result of a subtraction which caused the said remainder to be the opposite side of the datum level to said voltage level, and means for generating pulse signal elements which correspond one to each of the first-named pulses of the said train and distinguish between those first-named pulses which give rise to resultant voltages of the same sign as said voltage level with respect to the datum level and those which give rise to resultant voltages of the opposite sign.

9. Apparatus according to claim 8 wherein the said unidirectionally conducting device is a diode valve.

10. Apparatus according to claim 8 wherein the sense determining means comprises means to supply a bias signal in dependence upon a peak of said signal being of greater amplitude than the level stored by the first storage means to the said unidirectionally conducting device to render it non-conducting.

11. Apparatus for generating a pulse code signal representative of a voltage level with respect to a datum level, said apparatus comprising first storage means for initially storing the said voltage level, means for generating a signal formed by a train of pulses of progressively decreasing amplitude, means for continuously subtracting the said signal from the level stored by the first storage means, a multivibrator, a unidirectionally conducting device, means to supply to this unidirectionally conducting device the signal resulting from said continuous subtraction, the unidirectionally conducting device being arranged to be conducting only when the signal supplied thereto is the result of the subtraction of a peak of greater amplitude than the level stored by the first storage means, means to trigger the multivibrator on current flowing through this unidirectionally conducting device, second storage means, clamping means connected between the subtracting means and the second storage means for periodically transferring to the second storage means the level corresponding to the subtraction of each peak of said train from the level stored by the first storage means, means periodically to reduce the level stored by the first storage means to each new level stored by the second storage means, means dependent upon said multivibrator being triggered to override the last-mentioned means to prevent the level of the first storage means being reduced when the level stored by the second storage means is the result of a subtraction which caused the said remainder to be the opposite side of the datum level to said voltage level, and means for generating pulse signal elements which correspond one to each of the first-named pulses of the said train and distinguish between those first-named pulses which give rise to resultant voltages of the same sign as said voltage level with respect to the datum level and those which give rise to resultant voltages of the opposite sign.

12. Apparatus for generating a pulse code signal representative of a voltage level with respect to a datum level, said apparatus comprising means for generating a train of pulses of progressively decreasing amplitude, means for subtracting the peak voltages of the successive pulses of said train from a succession of voltage values respectively to produce a succession of resultant voltages, sense-determining means to determine whether each of said resultant voltages is greater or less than the datum level, means for supplying said succession of voltage values the first of which is the said voltage level and each of the subsequent voltage values is the resultant voltage from the nearest preceding subtraction as determined by said sensing means in which the resultant voltage is on the same side of the datum level as the said voltage level, and means operable by said sensing means for generating pulse signal elements which correspond one to each of the first-named pulses and distinguish between those first-named pulses that give rise to resultant voltage on opposite sides of the datum level.

References Cited in the file of this patent

UNITED STATES PATENTS

| | | |
|---|---|---|
| 2,438,908 | Goodall | Apr. 6, 1948 |
| 2,538,266 | Pierce | Jan. 16, 1951 |
| 2,592,061 | Oxford | Apr. 8, 1952 |